(12) United States Patent
Correa

(10) Patent No.: US 7,650,596 B2
(45) Date of Patent: Jan. 19, 2010

(54) METHOD FOR ECU CALIBRATION AND DIAGNOSTICS DEVELOPMENT

(75) Inventor: Colt R. Correa, Commerce, MI (US)

(73) Assignee: Accurate Technologies Inc., Wixom, MI (US)

( * ) Notice: Subject to any disclaimer, the term of this patent is extended or adjusted under 35 U.S.C. 154(b) by 755 days.

(21) Appl. No.: 10/696,393

(22) Filed: Oct. 29, 2003

(65) Prior Publication Data

US 2004/0163014 A1    Aug. 19, 2004

Related U.S. Application Data

(63) Continuation-in-part of application No. 10/366,167, filed on Feb. 13, 2003, now abandoned.

(51) Int. Cl.
*G06F 9/44* (2006.01)
*G06F 11/00* (2006.01)

(52) U.S. Cl. .................. 717/130; 717/131; 714/35

(58) Field of Classification Search .............. None
See application file for complete search history.

(56) References Cited

U.S. PATENT DOCUMENTS

| | | | |
|---|---|---|---|
| 4,910,663 A | 3/1990 | Bailey | |
| 5,446,900 A | 8/1995 | Kimelman | |
| 5,590,296 A | 12/1996 | Matsuo | |
| 5,619,698 A * | 4/1997 | Lillich et al. ............ | 717/168 |
| 5,701,500 A | 12/1997 | Ikeo et al. | |
| 5,732,210 A | 3/1998 | Buzbee ................ | 714/38 |
| 5,857,093 A | 1/1999 | Bradford ............... | 703/21 |
| 5,859,963 A | 1/1999 | O'Dowd et al. | |
| 5,901,225 A | 5/1999 | Ireton et al. ............ | 714/7 |
| 5,911,073 A | 6/1999 | Mattson et al. .......... | 717/104 |
| 5,940,016 A | 8/1999 | Lee | |
| 5,958,963 A | 9/1999 | Nguyen et al. .......... | 514/404 |
| 5,999,730 A | 12/1999 | Lewis | |
| 6,134,707 A | 10/2000 | Herrmann et al. ........ | 717/139 |
| 6,289,507 B1 | 9/2001 | Tanaka et al. ........... | 717/155 |
| 6,976,245 B2 | 12/2005 | Takayama et al. ........ | 717/127 |

(Continued)

OTHER PUBLICATIONS

Kessler, P.B.: "Fast Breakpoints: Design and Implementation" Sigplan Notices, Association for Computing Machinery, New York, NY, US vol. 25, No. 6, Jun. 20, 1990, pp. 78-84, XP000619455 ISSN: 0362-1340.

(Continued)

*Primary Examiner*—Tuan Q Dam
*Assistant Examiner*—Zheng Wei
(74) *Attorney, Agent, or Firm*—Harness, Dickey & Pierce, PLC

(57) ABSTRACT

A method is provided for controlling RAM variables embedded in a microprocessor software executable without modifications to the underlying source code. The method includes: presenting an software program having a plurality of machine instructions of a finite number of fixed lengths in an executable form; searching through the machine instructions of the executable and finding at least one appropriate instruction to replace; defining a replacement instruction for identified machine instructions in the software program; and replacing identified machine instructions in the executable form of the software program with the replacement instruction. The replacement instruction may be further defined as a branch instruction that references an address outside an address space for the software program.

11 Claims, 6 Drawing Sheets

U.S. PATENT DOCUMENTS

| | | | |
|---|---|---|---|
| 7,134,115 B2* | 11/2006 | Kawai et al. | 717/124 |
| 7,168,068 B2* | 1/2007 | Dawson | 717/130 |
| 2003/0061598 A1* | 3/2003 | Karp et al. | 717/129 |
| 2003/0110351 A1 | 6/2003 | Blood et al. | |
| 2004/0205720 A1* | 10/2004 | Hundt | 717/124 |

OTHER PUBLICATIONS

Anonymous: "Rapid algorithm development via overlay RAM" Research Disclosure, Mason Publications, Hampshire, GB, vol. 460, No. 7, Aug. 2002, XP007130945 ISSN: 0374-4353.

Eppinger, A: "ASCET—computer aided simulation of engine functions" IEE Colloquium on Computer Aided Engineering of Automotive Electronics, Apr. 27, 1994, pp. 5/1-5/13, XP006519405.

Hanselmann, H.: "Automotive control: from concept to experiment to product" Computer- Aided Control System Design, 1996. Proceedings of the 1996 IEEE International Symposium on Dearborn, MI, USA Sep. 15-18, 1996, New York, NY, USA, IEEE, US Sep. 15, 1996, pp. 129-134, XP010198777 ISBN: 0-7803-3032-3.

Smith M H et al: "Towards a more efficient approach to automotive embedded control system development" Computer Aided Control System Design, 1999. Proceedings of the 1999 IEEE International Symposium on Kohala Coast HI, USA Aug. 22-27, 1999, Piscataway, NJ, USA, IEEE, US, Aug. 22, 1999, pp. 219-224, XP010360469 ISBN: 0-7803-5500-8.

Buck B et al: "An API for runtime code patching" International Journal of High Performance Computing Applications Sage Science Press USA, vol. 14, No. 4, Nov. 2000, pp. 317-329, XP008079534 USA ISSN: 1078-3482.

* cited by examiner

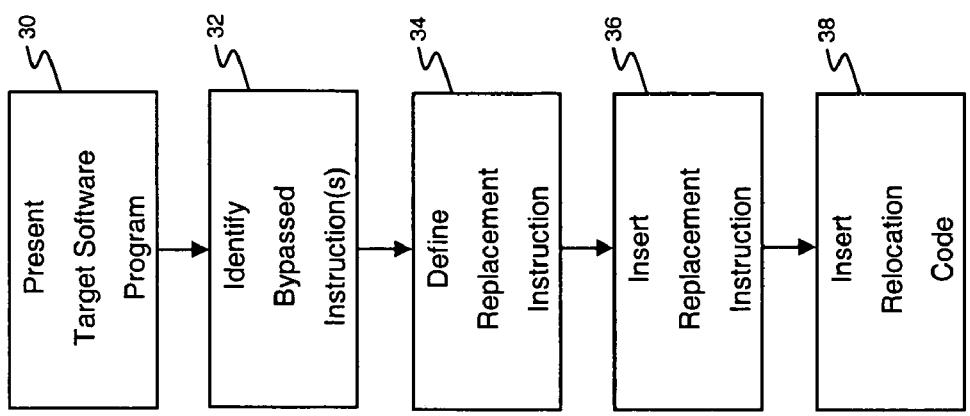

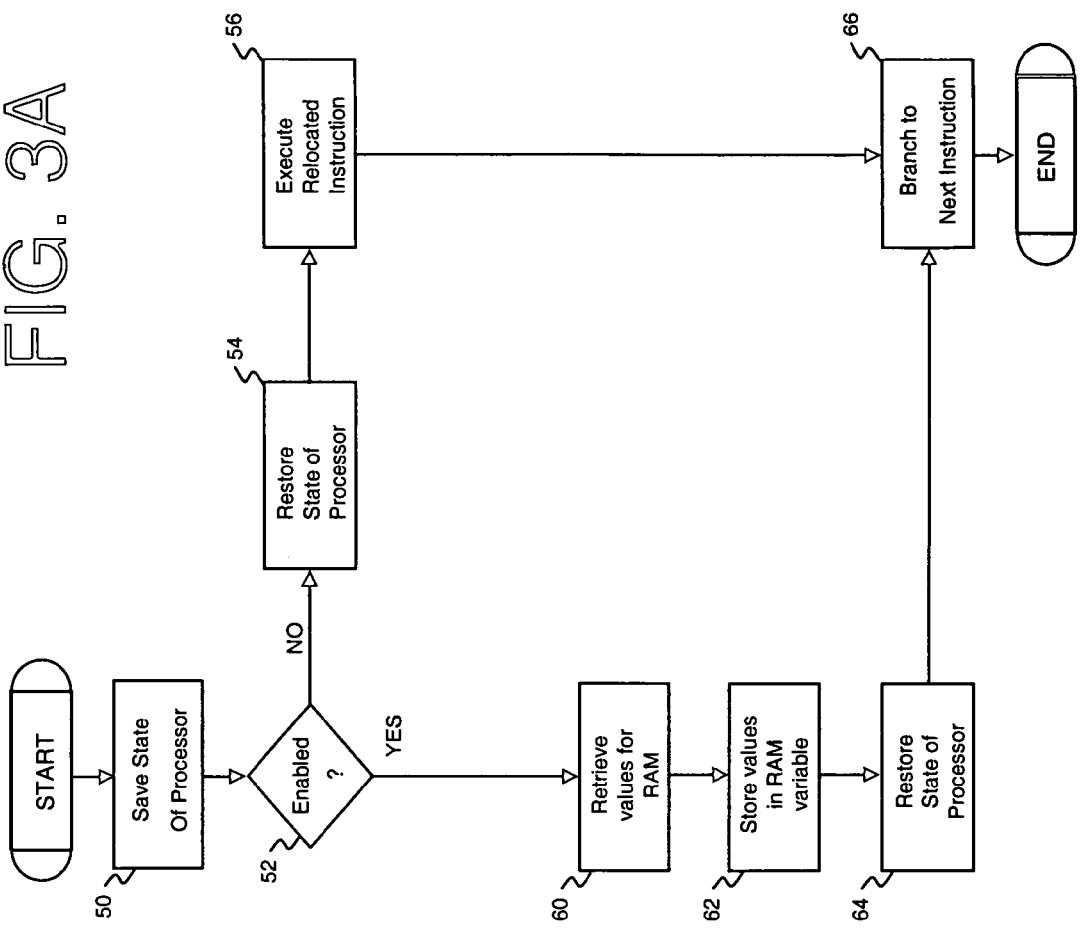

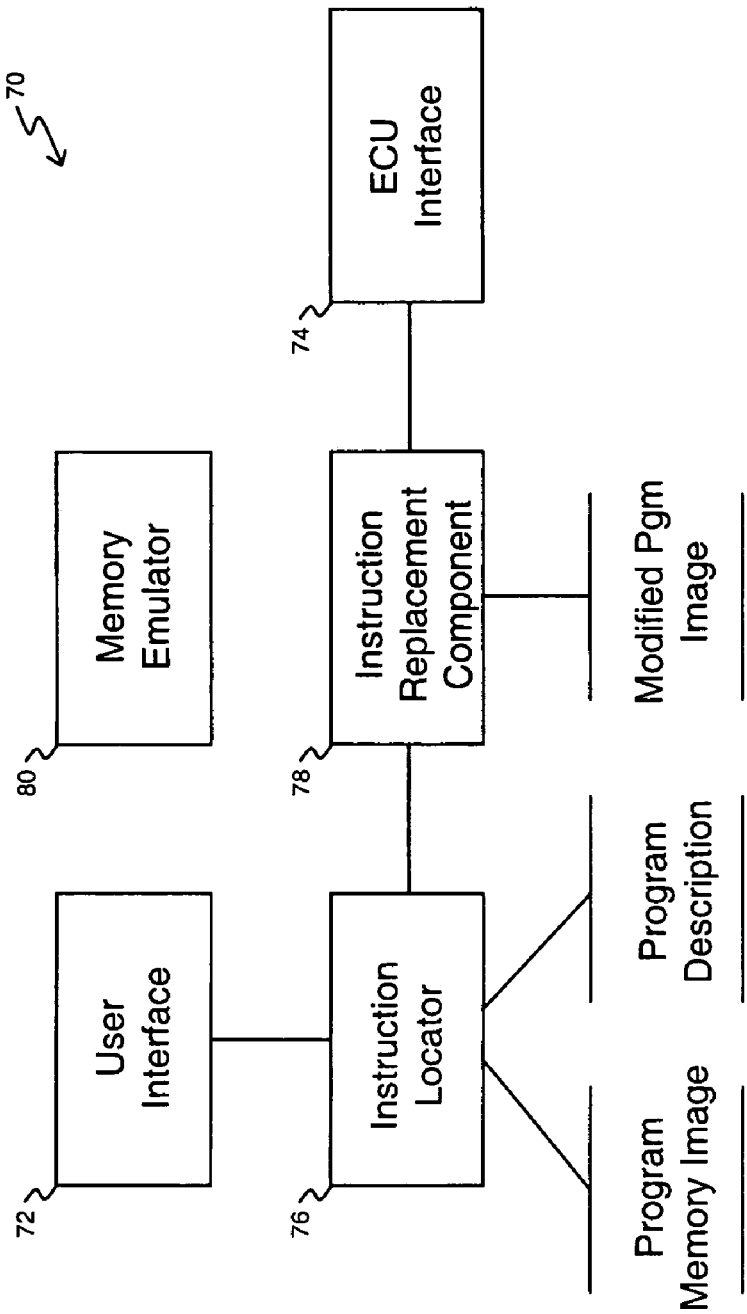

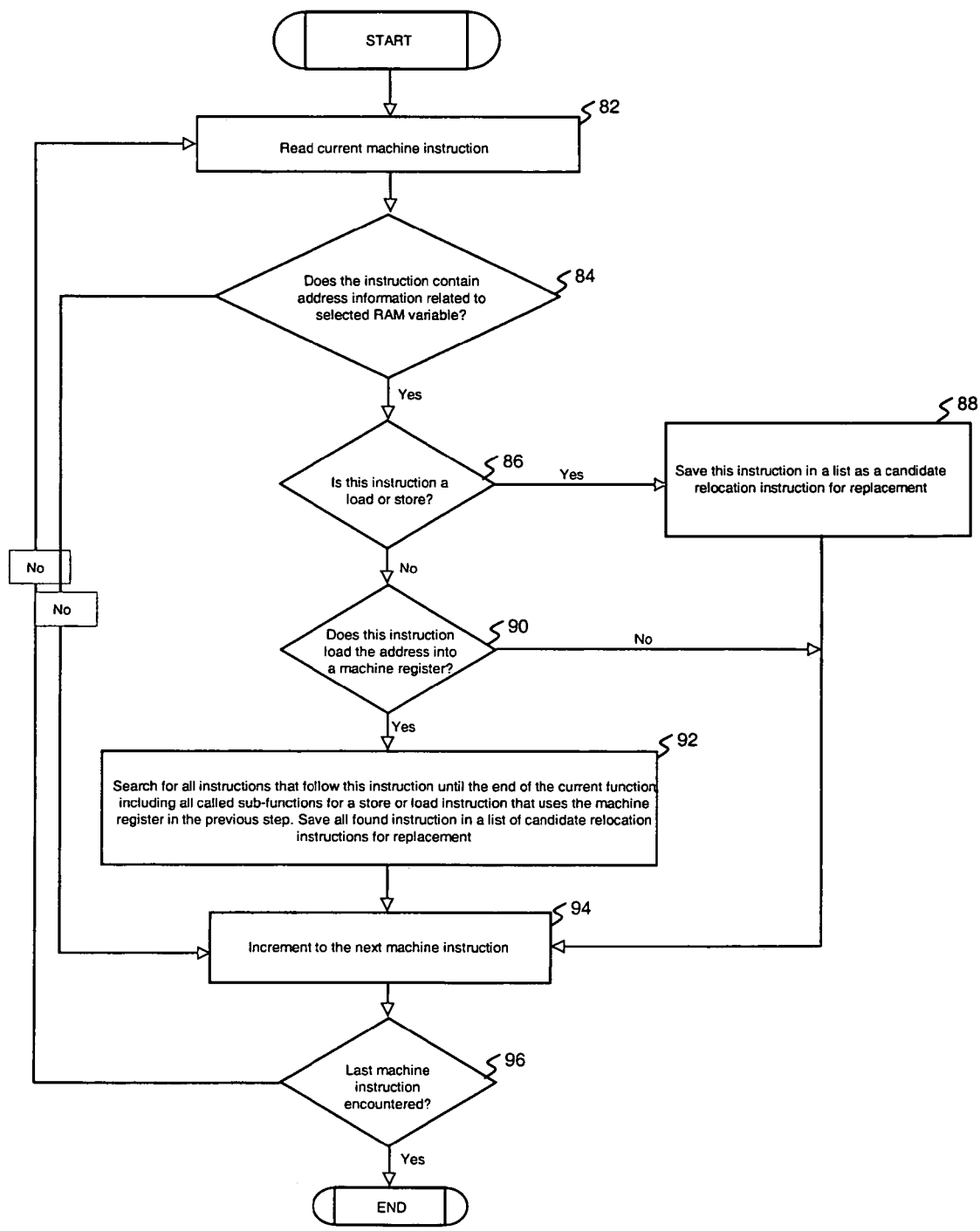

METHOD FOR ECU CALIBRATION AND DIAGNOSTICS DEVELOPMENT

CROSS-REFERENCE TO RELATED APPLICATIONS

This application is a continuation-in-part of U.S. patent application Ser. No. 10/366,167 filed on Feb. 13, 2003 now abandoned. The disclosure of the above application is incorporated herein by reference.

FIELD OF THE INVENTION

The present invention relates generally to an electronic control unit (ECU) calibration and diagnostics development and, more particularly, to a technique that enables calibration tools to overwrite user selected random access memory (RAM) variables without any modifications or access to the underlying ECU source code.

BACKGROUND OF THE INVENTION

In modern automotive electronic control units, there exist a number of embedded control algorithms that control different aspects of the vehicle. For instance, there may be an algorithm that controls the amount of fuel injected into the cylinders and a different control algorithm that is responsible for shifting gears in the transmission. These algorithms are developed in a way that they can be used on many different vehicle types, engines, and transmission for a variety of markets with different emission and safety requirements. During real-time execution, each of these algorithms use what is termed "calibrations" or "parameters" to adapt itself to the vehicle and requirements that it is controlling.

In the process of adjusting or "calibrating" an automotive ECU, often it is required to obtain a given set of operating conditions. Exemplary scenarios may include: (1) in order to calibrate or test an algorithm that controls the engine cooling fan(s), the engine coolant temperature must be greater than a given temperature; (2) in order to calibrate or tests an algorithm that controls the shifting of an automatic transmission from second to third gears, it is required that the vehicle speed be high enough to trigger the shift; (3) in order to calibrate or test an algorithm that adjusts the amount of fuel going to the cylinders of the engine based on altitude, it is often necessary to drive the vehicle across a range of altitudes from sea level to high mountain territory; and (4) when the catalytic converter temperature exceeds a safe value, one or more algorithms may be activated in an attempt to cool down the converter before damage occurs. Obtaining the necessary operating conditions can often be complex, costly and difficult.

However, the present invention provides a technique for overwriting user selected random access memory (RAM) variables. For instance, the RAM variable associated with the measured coolant temperature may be set to a value that will turn on the algorithm that controls the cooling fan(s). In another instance, the RAM variable associated with the vehicle speed may be set to a value higher than the 2-3 shift trigger point to force the transmission into a desired gear. In yet another instance, the RAM variable associated with the vehicle altitude calculation may be set to a value that simulates the desired operating altitude. In this way, various operating conditions may be simulated without any modifications or access to the underlying ECU source code.

Similarly, the present invention may be employed to achieve actual operating conditions that may be difficult to otherwise obtain. For example, sometimes it is difficult in a vehicle equipped with an automatic transmission to achieve a condition where the engine rpm is very low while the engine torque is high because the transmission normally will downshift to a lower gear. With the present invention it is possible to overwrite the commanded gearstate of the transmission and force the transmission to any desired state regardless of engine rpm and torque load. In another example, it is sometimes necessary to quickly degrade/wear clutches inside an transmission or torque converter to simulate a high mileage operating condition. One way of degrading clutches is to allow slippage for an extended period of time between the friction material of these clutches. With the present invention it is possible to force a clutch into a slippage condition by overwriting and controlling the RAM variable associated with the desired clutch state (unlock, partial lock, full lock). Thus, it is desirable to provide a technique for simulating an embedded controller and the algorithms in the embedded controller without the need to provide physical stimulation to the embedded controller.

SUMMARY OF THE INVENTION

In accordance with the present invention, a method is provided for controlling one or more RAM variables in a microprocessor without modifications to the underlying source code. The method includes: presenting an software program having a plurality of machine instructions of a finite number of fixed lengths in an executable form; searching through the machine instructions of the executable and finding at least one appropriate instruction to replace; defining a replacement instruction for identified machine instructions in the software program; and replacing identified machine instructions in the executable form of the software program with the replacement instruction. In one aspect of the present invention, the replacement instruction is further defined as a branch instruction that references an address outside an address space for the software program.

For a more complete understanding of the invention, its objects and advantages, reference may be had to the following specification and to the accompanying drawings.

BRIEF DESCRIPTION OF THE DRAWINGS

FIG. 1 is a flowchart illustrating a method for controlling RAM variables in a microprocessor without modifications to the underlying source code in accordance with the present invention;

FIGS. 3A and 3B are flowcharts illustrating exemplary embodiments of relocation code in accordance with the present invention;

FIG. 4 is a diagram depicting an exemplary embodiment of a calibration tool that is configured to support the present invention; and FIG. 5 is a diagram depicting exemplary logic to determine relocation instructions.

DETAILED DESCRIPTION OF THE PREFERRED EMBODIMENTS

Figure 2B:
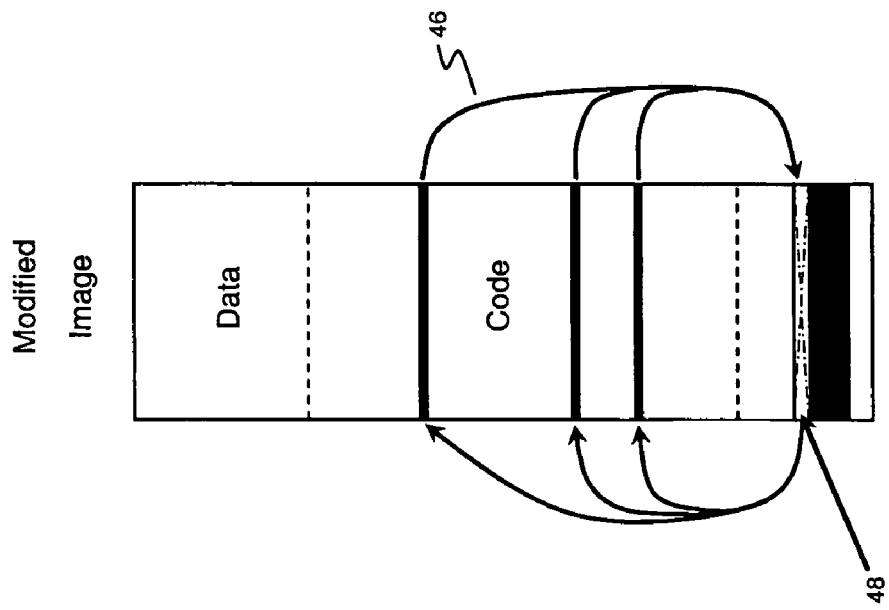
FIG. 2B is a diagram illustrating a program memory image modified in accordance with the present invention.

In accordance with the present invention, a method is provided for controlling one or more RAM variables in an executable software program embedded in a microprocessor without modifications to the underlying source code. While the following description is provided with reference to RAM variables, it is readily understood that this technique is also applicable to manipulating any portion of the random access memory space associated with the software program.

Referring to FIG. 1, the target software program is provided at step 30 in an executable form that is defined by a plurality of machine instructions of a finite quantity of fixed lengths. In many conventional microprocessors, machine instructions are limited to a finite quantity of fixed lengths. For example, machine instructions in a PowerPC-based processor are 32 bits in length; whereas Tri-Core and ST10 processors have machine instructions that are 16 bits and 32 bits in length. Thus, some machine instructions in the underlying software may be replaced with other machine instructions. Although this concept serves as the basis for the present invention, it is readily understood that the broader aspects of the present invention may be extended to microprocessors having machine instructions of a varied length.

To manipulate a given RAM variable, one or more machine instructions having access to the variable are replaced with replacement instructions. Machine instructions to be replaced are first identified at step 32. These machine instructions are referred to herein as relocated instructions. Identification of a machine instruction includes determining a location or address for the machine instruction inside the software executable as further described below.

In the preferred embodiment, the relocated instructions are preferably machine instructions that access or modify variables that correspond to the RAM variables that are desired to be controlled. For instance, since there are no machine instructions that directly modify the memory space of a PowerPC-based processor, the code must load the value of the variable into a register, modify the value (e.g., though a math operation), and then store the modified value back into its appropriate memory space. Thus, in a PowerPC-based processor, the relocated instructions are specifically designated as load and/or store instructions for the applicable variables in the target software. However, it is readily understood that other types of machine instructions may also serve as relocated instructions.

Next, an appropriate replacement instruction is defined at step 34 for each of the identified machine instruction. Each replacement instruction is preferably defined as a branch instruction that references an address outside the memory space for the target software program. In the preferred embodiment, branch instructions pass processing control to a series of machine instructions that are defined in the unused portion of the memory space and are referred to herein as relocation code. Relocation code is responsible for obtaining the desired value for the given RAM variable and writing this value into the given RAM variable as further described below.

Alternatively, it is envisioned that replacement instructions may be defined as instructions that cause an interrupt or an exception to occur in the microprocessor. For example, PowerPC-based processors provide a "sc" command to perform this function; whereas ST10-based processors provide a "trap" instruction to perform this function. Although these types of instructions provide an alternative technique for branching to a different address space, this approach is generally not preferred because these types of instructions may interfere with the normal operation of the microprocessor.

In another alternative, replacement instructions are defined as no operation instructions that cause the microprocessor to perform no function. Replacing instructions that access a given RAM variable with a no operation instruction prevents the microprocessor from updating the variable. Thus, it is envisioned that a desired value may be placed into the RAM variable using available standard features of the ECU. For example, ECU controller available from Ford Motor Company includes a POKE feature, whereby a calibration tool can write a value to RAM location. The present invention extends this preexisting functionality by disabling the ECU from subsequently writing to given RAM addresses, thereby enabling the calibration system complete control over the value of the given RAM addresses. It is understood that there are other methods for writing a value into a RAM location; examples include: a dual ported RAM memory, BDM (Background Debug Mode) port on PowerPC-based microcontrollers and an AUD (Advanced User Debug) port on microprocessors from Hitachi.

The identified machine instructions of the target software program are then replaced at step 36 with replacement instructions. Specifically, replacement instruction are inserted into the program memory image of the software program at the identified address. Lastly, the relocation code is also inserted at step 38 at a location outside the software executable program space.

Figure 2A:
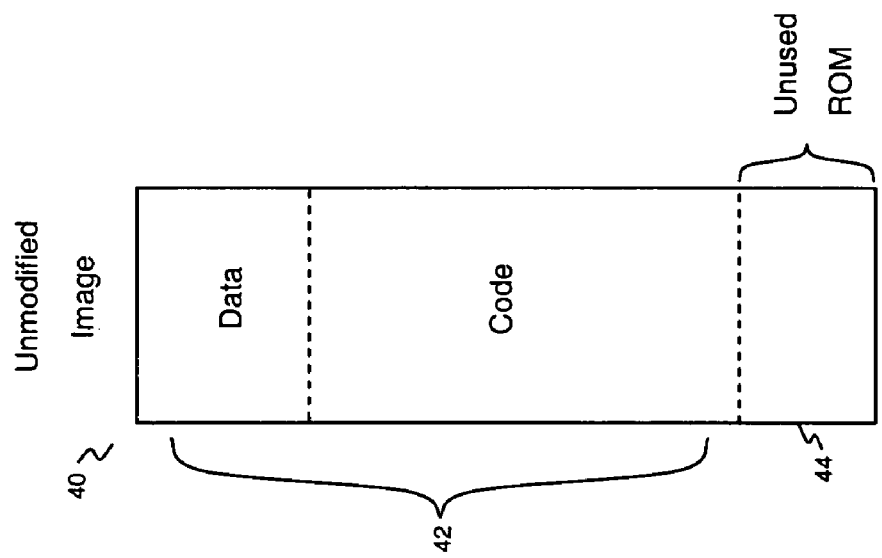
FIG. 2A is a diagram illustrating an unmodified program memory image for a target software program embedded in a microprocessor.

FIG. 2A illustrates an unmodified program memory image 40 for a target software program embedded in a microprocessor. The memory space may be partitioned into an address space 42 for the target software program and an unused portion 44 of memory space. It is readily understood that the address space 42 for the target software program may be further partitioned into a data portion and a code portion.

FIG. 2B illustrates a program memory image modified in accordance with the present invention. One or more relocated instructions designated at 46 may be replaced with replacement instructions. Replacement instructions in turn pass processing control to relocation code 48 that is defined in a memory space outside of the memory space for the target software program.

Figure 3B:
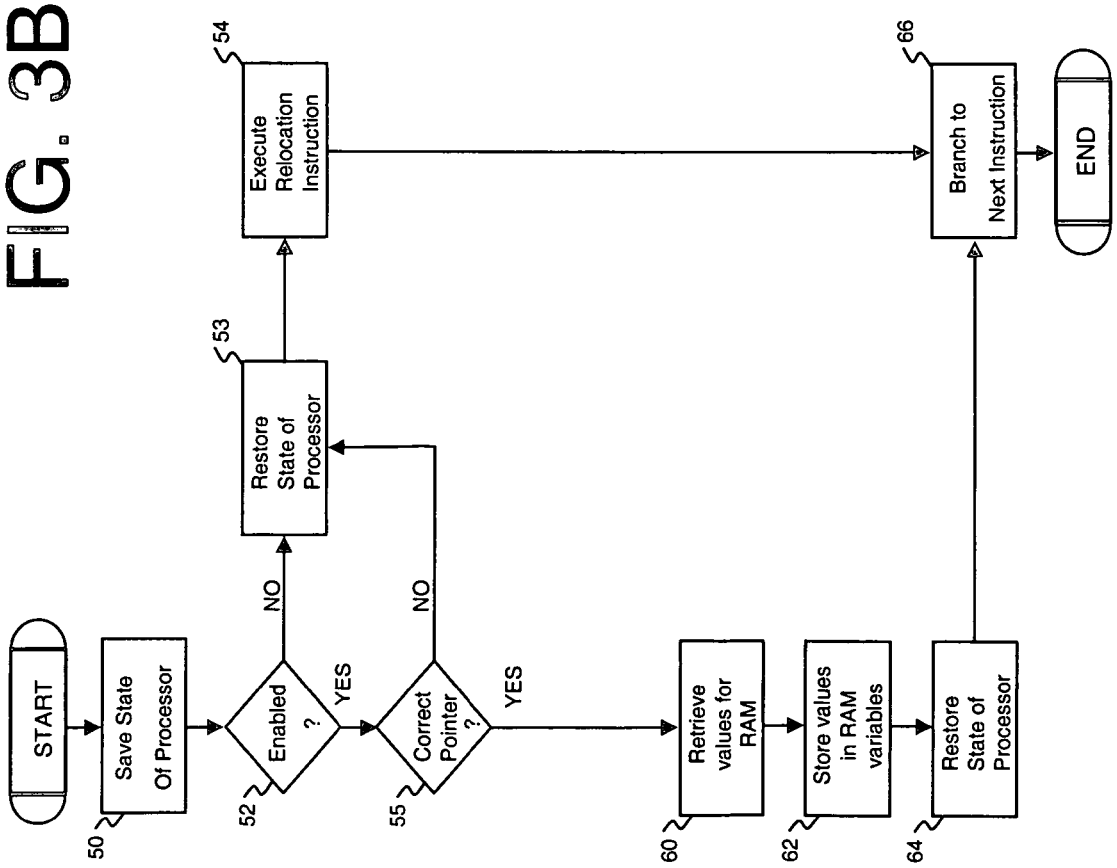

FIGS. 3A and 3B are flowcharts that illustrate exemplary embodiments of relocation code in accordance with the present invention. In general, the relocation code performs four primary functions. Referring to FIG. 3A, the relocation code initially determines if the relocation feature is enabled or disabled as shown at step 52. When the relocation feature is disabled, the relocation code executes the relocated instruction as shown at step 56; and then processing branches at step 66 to the machine instruction following the relocated instruction in the target software program.

On the other hand, when the relocation feature is enabled, the relocation code performs the following functions. The relocation code reads the desired value of the RAM variable at step 60 from a location which may be modified by the calibration system. The relocation code then stores the desired value at step 62 into the original RAM variable.

Lastly, the relocation code branches processing at step 66 to the machine instruction following the relocated instruction in the target software program. The relocation code described above assumes a direct addressing method of storing variable values. In other words, each machine instruction that manipulates the value of a variable contains the address information needed to access that variable in memory.

In some instances, an indirect addressing method may be employed for loading or storing variable values. Indirect addressing first loads the address of a variable into a machine register, and then uses the register to load or store the value of the variable. Thus, it is not possible to directly determine what store or load instructions are associated with a given variable. For these types of instructions, the present invention determines the machine register used as the pointer to the variable and then searches, starting from the specified instruction, for all store instruction using that register. The search includes all instructions in the current function (or routine) as well as all function that may be called by the function. In this way, all instructions that have the possibility of being load or store instructions to the given variable are modified. With this method, it is possible to modify a load or store instruction that is not associated with the given variable.

Relocation code for an indirect addressing method of storing variable values is shown in FIG. 3B. In this case, it is necessary for the relocation code to determine that the value of the register is in fact pointing to the given variable as shown at step 55; otherwise the relocation code is in a manner as set forth in relation to FIG. 3A.

Conventional calibration tools may be configured to support the present invention as shown in FIG. 4. Calibration tools are generally configured to calibrate and test software-implemented control algorithms which may be embedded in an automotive electronic control unit (ECU). Exemplary calibration tools are commercially available from Accurate Technologies Inc., dSPACE GmbH, ETAS GmbH, and Vector GmbH. While the following description is provided with reference to control algorithms embedded in an automotive electronic control unit, it is readily understood that the broader aspects of the present invention are applicable to other types of software applications which are embedded in microprocessors.

The calibration tool 70 is generally comprised of a user interface 72, an ECU interface 74 and, optionally a memory emulator 80. A user configures the calibration environment through the use of the user interface 72. In general, the user interface may be used to specify the target software program and the RAM variables that are desired to be controlled. In addition, the user may further specify the machine instructions which are to be relocated as well as the corresponding replacement instructions. One skilled in the art will readily recognize that a suitable user interface may be designed to support these required functions of the present invention.

In accordance with the present invention, the calibration tool 70 may be further configured to include an instruction locator 76 and an instruction replacement component 78. The instruction locator 76 is adapted to receive a specified RAM variable address, and data type within a target software program and operable to identify location information for the machine instructions associated with reads or writes to the RAM address within the executable form of the target software program. In one exemplary embodiment, the instruction locator 76 searches through the application image (hex record) for the target software and parses each machine instruction therein. For Embedded Application Binary Interface (EABI) compliant compilers, load and store instructions can be identified in the application image. In PowerPC-based processors, running software that is EABI compliant, registers must be used in specific ways. For example, R13 must be used to point to the small data area for read/write memory. This register normally is used to index to the internal random access memory of the processor. Using this specific information, the instruction locator has the ability to reverse calculate an address for any load or store instruction in the small data area.

Another example for obtaining address information from an instruction is using machine register R2. This register normally contains a pointer to read only memory in the address space of the target processor. Sometimes pointers or address values are stored in the read only memory to store the location of certain RAM variables or ROM parameters. It is possible to interpret a load or read instruction that uses the R2 register and determine what address is being read or loaded. In this way, the instruction locator as defined later, can also read the read only address containing address or pointer information. It is readily understood that other techniques for identifying location information for a specific machine instruction are within the broader aspects of the present invention.

The instruction replacement component 78 is then operable to replace the specified machine instruction with a replacement instruction. To do so, the instruction replace component 78 is adapted to receive the replacement instruction and then insert the replacement instruction into a program memory image of the software program at the identified address. In the exemplary embodiment, the instruction replacement component 78 also generates the applicable relocation code and inserts the relocation code into an unused portion of the memory space on the target microprocessor.

The modified program memory image is then FLASHED or downloaded into the ECU for execution. During execution, the replacement instructions are executed in place of the original machine instructions which accessed a given RAM variable. In this way, the RAM variable is being controlled by the calibration tool in a manner different than was originally contemplated by the ECU. In one exemplary embodiment, the calibration tool includes an ECU interface 74 which is operable to download the modified program memory image into the ECU. However, it is readily understood that other techniques may be employed to FLASH the ECU. Moreover, it is to be understood that only the relevant steps of the process are discussed herein, but that other software-implemented features may be needed to manage and control the overall calibration tool.

In order to access constants within a control algorithm embedded in a read-only memory space, it is envisioned that the calibration tool may also employ a memory emulator 80 or other interface to the ECU, such as CCP (Can Calibration Protocol). A suitable memory emulator is the M5 memory emulator which is commercially available from the Accurate Technologies, Inc.

An exemplary algorithm employed by the instruction locator is further described in relation to FIG. 5. Briefly, the algorithm searches for machine instructions that contain addressing information related to the given RAM variables. To begin, a first machine instruction residing in the program executable is read at step 82. For each machine instruction, a determination is made at step 84 as to whether the instruction contains address information related to the desired RAM variable. Some examples of instructions that may contain addressing information for a PowerPC microcontroller are the addi, ori, stfs, and ldfs instructions. However, it is readily understood that other instructions which contain address information are within the scope of the present invention. In addition, one readily skilled in the art will appreciate that more than one machine instruction may be used to determine addressing information for the desired RAM variable. For example, in a PowerPC-based microcontroller an addis instruction followed by an ori instruction can be used to load an address into a machine register.

When the current instruction contains address information for the desired RAM variable, a determination is then made at step 86 as to whether the current instruction is a load or a store instruction. If the current instruction contains address information for the desired RAM variable and is a load or a store instruction, then the instruction is saved in a list as a candidate instruction for replacement as shown at step 88. On the other hand, when the current instruction does not contain information for the desired RAM variable, processing continues with the next machine instruction as shown at step 94.

When the current instruction contains address information for the desired RAM variable, but is not a load or a store instruction, then a determination is made at step 90 as to whether the instruction loads an address for the RAM variable into a processor register. If the instruction does load the address, then processing proceeds as follows. Every machine instruction contained in the current function and all possible called functions following the instruction that load the address into the machine register are read and evaluated at step 92. Each instruction identified as a load or a store instruction that uses the given register is again saved in the list of candidate instructions. Processing then continues with the next machine instruction at step 94 until the last instruction of the program is encountered.

While the invention has been described in its presently preferred form, it will be understood that the invention is capable of modification without departing from the spirit of the invention as set forth in the appended claims.

What is claimed is:

1. A method for controlling a value of a RAM (random access memory) parameter inside an executable program, comprising:

presenting a software program in executable form and having a plurality of machine instructions of a finite quantity of fixed lengths;

selecting the parameter of interest that is defined in random access memory associated with the software program;

evaluating each machine instruction in the executable form of the software program to identify one or more load or store machine instructions that contain address information for the parameter;

replacing the identified machine instructions in the executable form of the software program with a branch instruction that references an address outside an address space of the software program;

defining a set of relocated instructions at the address referenced by the branch instruction, wherein the set of relocated instructions function to change the value of the parameter; and executing the executable form of the software program having the branch instruction.

2. The method of claim 1 wherein the step of evaluating each machine instruction further comprises determining whether a given machine instruction loads an address for the parameter into a machine register; and evaluating each instruction nested in the given machine instruction to further identify machine instructions that contain address information for the parameter when the given machine instruction loads an address for the parameter.

3. The method of claim 1 further comprises replacing machine instructions identified as a load instruction with a branch instruction.

4. The method of claim 3 wherein the step of replacing machine instruction further comprises inserting the branch instruction into a program memory image of the software program at said address.

5. The method of claim 1 wherein said branch instruction references a set of relocation instruction residing at an unused address space of the software program.

6. A computer-implemented calibration system for modifying RAM (random access memory) parameters of a software program in an executable form and having a plurality of machine instruction of a finite quantity of fixed length embedded in a microprocessor, comprising:

an instruction locator embodied as computer executable instructions on a computer readable medium and operating on a different processor than the microprocessor, the instruction locator that selects a parameter of interest in the software program that is defined in random access memory associated with the software program and evaluates each machine instruction in the executable form of the software program to identify one or more load or store machine instructions that contain address information for the parameter; and an instruction replacement component embodied as computer executable instructions on a computer readable medium and operating on the different processor than the microprocessor and in data communication with the instruction locator, the instruction replacement component adapted to receive a branch instruction for the at least one machine instruction and operable to replace the identified machine instructions in the executable form of the software program with the branch instruction.

7. The computer-implemented calibration system of claim 6 wherein the instruction locator evaluates each machine instruction to determine whether a given machine instruction loads an address for the parameter into a machine register; and evaluates each instruction nested in the given machine instruction to further identify machine instructions that contain address information for the parameter when the given machine instruction loads an address for the parameter.

8. The computer-implemented calibration system of claim 7 wherein the instruction replacement component is operable to insert the replacement instruction into a program memory image of the software program at said address.

9. The computer-implemented calibration system of claim 6 wherein the instruction replacement component is operable to generate a set of relocation instructions, such that the branch instruction passes processing control to the set of relocation instructions.

10. The computer-implemented calibration system of claim 9 wherein the instruction replacement component is further operable to insert the set of relocation instructions in a memory space of the microprocessor that resides at an unused address space of the software program.

11. A method for controlling a value of a RAM (random access memory) parameter inside an executable program, comprising:

presenting a software program in executable form and having a plurality of machine instructions of a finite quantity of fixed lengths;

selecting the parameter of interest that is defined in random access memory associated with the software program;

evaluating each machine instruction in the executable form of the software program to identify machine instructions that contain address information for the parameter;

replacing the identified machine instructions in the executable form of the software program with a branch instruction when the identified machine instruction is a load instruction or a store instruction, where each branch instruction references an address outside an address space of the software program;

evaluating each of the identified machine instructions by searching for additional machine instructions that contain address information for the parameter and are referenced by the identified machine instructions when the identified machine instruction is not a load instruction nor a store instruction;

defining a set of relocated instructions at each address referenced by the branch instructions, wherein each set of relocated instructions accesses the parameter in random access memory and performs an operation to change a value of the parameter in a different manner; and executing the executable form of the software program having the branch instruction.

* * * * *